US009947283B2

(12) United States Patent
Chen et al.

(10) Patent No.: US 9,947,283 B2
(45) Date of Patent: Apr. 17, 2018

(54) DISPLAY APPARATUS WITH TESTING FUNCTIONS AND DRIVING CIRCUIT AND DRIVING METHOD THEREOF

(71) Applicant: RICHTEK TECHNOLOGY CORPORATION, Zhubei, HsinChu (TW)

(72) Inventors: Chien-Chung Chen, Hsinchu (TW); Hsing-Shen Huang, Zhubei (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 0 days.

(21) Appl. No.: 15/217,060

(22) Filed: Jul. 22, 2016

(65) Prior Publication Data

US 2017/0221440 A1 Aug. 3, 2017

Related U.S. Application Data

(60) Provisional application No. 62/289,005, filed on Jan. 29, 2016.

(51) Int. Cl.

*G06F 3/038* (2013.01)
*G09G 5/00* (2006.01)
*G09G 3/36* (2006.01)

(52) U.S. Cl.

CPC ....... *G09G 3/3677* (2013.01); *G09G 2330/12* (2013.01)

(58) Field of Classification Search

CPC ............. G09G 3/3674; G09G 2330/04; G09G 2330/12; G09G 2320/0214; G09G 2310/061; G09G 2320/0693; G09G 2310/08

See application file for complete search history.

(56) References Cited

U.S. PATENT DOCUMENTS

| | | | | |
|---|---|---|---|---|
| 8,643,993 | B2 | 2/2014 | Tsai et al. | |
| 2007/0273632 | A1* | 11/2007 | Kishimoto | G09G 3/20 345/98 |
| 2011/0043493 | A1* | 2/2011 | Chen | G09G 3/3685 345/204 |
| 2011/0279436 | A1* | 11/2011 | Komiya | G09G 3/3233 345/212 |

(Continued)

*Primary Examiner* — Erin M File

(74) *Attorney, Agent, or Firm* — Tung & Associates

(57) ABSTRACT

The present invention provides a display apparatus, including: a display panel circuit which includes a panel load line and performs a scanning display operation; and a panel driving circuit. The panel driving circuit determines at least a test phase and a scanning display phase according to a display control signal generated by a timing control circuit, wherein the test phase is a partial time period when the panel driving circuit does not perform the scanning display operation. The panel driving circuit generates a test driving signal on the panel load line, and detects an electronic characteristic of the display panel circuit so as to determine a failure item thereof during the test phase according to a predetermined test instruction. The panel driving circuit generates a display driving signal on the panel load line for the scanning display operation according to the display control signal during the scanning display phase.

29 Claims, 11 Drawing Sheets

(56) References Cited

U.S. PATENT DOCUMENTS

| | | | | |
|---|---|---|---|---|
| 2013/0120334 | A1* | 5/2013 | Kim | G09G 3/3688 345/208 |
| 2013/0328854 | A1 | 12/2013 | Ruan et al. | |
| 2014/0009512 | A1* | 1/2014 | Lee | G09G 5/02 345/690 |
| 2015/0187280 | A1* | 7/2015 | Park | G09G 3/3291 345/691 |
| 2015/0310808 | A1* | 10/2015 | Lee | G09G 3/20 345/690 |

* cited by examiner

Conventional Frame Scanning

Test Phase during Display Frame Blanking Time

DISPLAY APPARATUS WITH TESTING FUNCTIONS AND DRIVING CIRCUIT AND DRIVING METHOD THEREOF

CROSS REFERENCE

The present invention claims priority to U.S. 62/289,005, filed on Jan. 29, 2016.

BACKGROUND OF THE INVENTION

Field of Invention

The present invention relates to a display apparatus, in particular to a display apparatus with testing functions. The present invention also relates to a driving circuit and a driving method of the display apparatus.

Description of Related Art

FIG. 1 shows a prior art display apparatus (display apparatus 300) disclosed in US 2013/0328854, wherein a processor 370 monitors the input voltage and the output voltage to determine whether the display voltage VOD is shorted; if yes, the power switching device is turned OFF to cut off the display voltage VOD.

The prior art in FIG. 1 has a drawback that: because this prior art determines whether the display voltage VOD is shorted only by monitoring the input voltage and the output voltage, it requires detecting a large short circuit current to trigger the protection; this prior art cannot effectively detect failure items such as a leakage current whose amount is much smaller than a short circuit current. Other drawbacks of this prior art are that the timing for detecting whether the display voltage VOD is shorted is not very flexible, and that this prior art cannot actively provide and execute various test patterns.

FIG. 2 shows a prior art short-circuit detection circuit (short-circuit detection circuit 10) for a display apparatus disclosed in U.S. Pat. No. 8,643,993, wherein the short-circuit detection circuit 10 detects if the current of the driving switch P1 is overly high and generate a short-circuit detection signal.

The prior art in FIG. 2 has drawbacks that the short-circuit detection circuit 10 can only passively detect if the current of driving switch P1 is overly high within a short window in a cycle period of a display control signal (control signal in the figure); this prior art cannot flexibly determine the detection timings, and cannot actively provide and execute various test patterns.

FIG. 3 shows a prior art display apparatus with over current protection disclosed in U.S. Pat. No. 8,643,993, wherein an over current protection circuit 700 detects an over current of a clock signal which drives the display panel at the leading edge of the clock signal, and takes actions when necessary.

The prior art in FIG. 3 has drawbacks that the over current protection circuit 700 can detect the over current of the clock signal only within a short window; this prior art cannot flexibly determine the detection timings, and cannot actively provide and execute various test patterns.

Compared to the prior arts in FIGS. 1, 2 and 3, the present invention has advantages that various test patterns can be provided to test a display apparatus, at flexible timings during non-display driving period. Hence the present invention can detect various more types of failure items and has a higher sensitivity for failure detection, compared to all the aforementioned prior arts.

SUMMARY OF THE INVENTION

From one perspective, the present invention provides a display apparatus, comprising: a display panel circuit which includes a panel load line, the display panel circuit being configured to operably execute a scanning display operation; and a panel driving circuit, configured to operably generate a panel load driving signal according to a display control signal generated by a timing control circuit and a driving voltage and/or a driving current generated by a driving power circuit, wherein the panel load driving signal is coupled to the panel load line to drive the display panel circuit, and the panel load driving signal includes a test driving signal and a display driving signal; the panel driving circuit including: a phase determining circuit, which determines at least a test phase according to the display control signal, or determines at least a test phase and a scanning display phase according to the display control signal, and generates a phase determining signal indicating whether or not in the test phase, wherein the test phase is apart of a period wherein the display panel circuit is not executing the scanning display operation; a driving stage circuit, which includes a driving switch circuit; and a driving logic circuit, which is configured to operably perform the following driving operations according to the display control signal and the phase determining signal: (A) when the scanning display phase exists, generating a switch control signal according to the display control signal during the scanning display phase, to control the driving switch circuit of the driving stage circuit to switch the driving voltage and/or the driving current for generating the display driving signal to drive the panel load line such that the display panel circuit performs the scanning display operation; and (B) during a partial time period within the test phase, generating the switch control signal according to a test instruction to control the driving switch circuit of the driving stage circuit to switch the driving voltage and/or the driving current for generating the test driving signal to drive the panel load line for testing a failure item of the display panel circuit, wherein the test instruction is a pre-determined test instruction or a programmable test instruction.

In one embodiment, the panel driving circuit further includes: a detection and determination circuit, configured to operably detect an electrical characteristic of the panel load line during the partial time period within the test phase according to the test instruction, for determining whether the failure item exists of the display panel circuit and generating a failure state flag in correspondence with the determination of the existence of the failure item; the detection and determination circuit including: a detection comparison circuit, configured to operably detect the electrical characteristic to generate a detection comparison result; and a detection logic circuit, configured to operably determine whether the failure item exists according to the detection comparison result and generate the failure state flag; wherein the driving stage circuit stops generating the display driving signal when the failure state flag indicates the existence of the failure item, such that the display panel circuit stops the scanning display operation.

In one embodiment, the electrical characteristic includes one or more of a load line voltage, a load line voltage change rate, a load line current, and/or a load line current change rate of the panel load line; the failure item includes one or more of a short circuit, a leakage current, and/or an over current of the display panel circuit.

In one embodiment, the detection and determination circuit further detects the electrical characteristic of the panel load line for determining the existence of the failure item of the display panel circuit during a partial time period within the scanning display phase and generates the failure state flag.

In one embodiment, the driving voltage includes a driving high voltage and a driving low voltage, and the driving switch circuit includes a positive driving switch and a negative driving switch, wherein the positive driving switch and the negative driving switch are configured to operably switch the driving high voltage and the driving low voltage respectively according to the switch control signal to generate the panel load driving signal; and the detection comparison circuit includes a positive detection circuit and a negative detection circuit, wherein the positive detection circuit is configured to operably generate the detection comparison result according to the electrical characteristic of the panel load line and the driving high voltage, and the negative detection circuit is configured to operably generate the detection comparison result according to the electrical characteristic of the panel load line and the driving low voltage.

In one embodiment, the display apparatus further comprises another driving stage circuit requiring protection, wherein the display panel circuit further includes another panel load line requiring protection, wherein the driving stage circuit requiring protection and the panel load line requiring protection need to avoid receiving the test driving signal; the driving stage circuit requiring protection being configured to operably generate another panel load driving signal requiring protection according to the display control signal, and the panel load driving signal requiring protection being coupled to the panel load line requiring protection to drive the display panel circuit to perform the scanning display operation; wherein the driving logic circuit further generates a test phase mask signal according to the phase determining signal, and the driving stage circuit requiring protection masks the display control signal during the test phase according to the test phase mask signal generated by the driving logic circuit, such that the driving stage circuit requiring protection stop generating the panel load driving signal requiring protection, whereby the display panel circuit stops the display driving operation.

In one embodiment, the driving logic circuit generates the test driving signal to drive the panel load line for testing the failure item of the display panel circuit during at least a first partial time period within the test phase; the detection and determination circuit detects the electrical characteristic to determine whether the failure item exists and generate the failure state flag during at least a second partial time period within the test phase.

In one embodiment, the first partial time period and the second partial time period have one of the following relationships: (A) the first partial time period and the second partial time period start and end at the same time; and (B) the second partial time period includes the first partial time period and the second partial time period ends later than the first partial time period.

In one embodiment, the test phase includes at least one of the followings: (1) a partial time period of an initialization phase, wherein the initialization phase is a period of time which starts from when a power source of the display apparatus rises above a pre-determined operational voltage threshold and ends at a starting time of a first time execution of the scanning display phase; (2) a partial time period of a display frame blanking period, wherein the display frame blanking period is a period when the display apparatus does not perform the scanning display operation between display frames which are displayed by the display apparatus through the scanning display operation; and (3) a partial time period of a scanning line blanking period, wherein the scanning line blanking period is a period when the display apparatus does not perform the scanning display operation between scanning lines which are displayed by the display apparatus through the scanning display operation.

In one embodiment, the display control signal includes a display frame synchronization signal and/or a scanning line synchronization signal; the phase determining circuit determines the test phase and generates the test phase determining signal according to the display frame synchronization signal and/or the scanning line synchronization signal.

In one embodiment, the phase determining circuit determines the test phase and/or generates the test instruction according to a test mode signal.

From another perspective, the present invention provides a panel driving circuit configured to operably drive a display apparatus by generating a panel load driving signal according to a display control signal generated by a timing control circuit and a driving voltage and/or a driving current generated by a driving power circuit, wherein the display apparatus includes a display panel circuit configured to operably execute a scanning display operation, the display panel circuit including a panel load line, and the panel load driving signal being coupled to the panel load line of the display panel circuit of the display apparatus, the panel driving circuit including: a phase determining circuit, which determines at least a test phase according to the display control signal, or determines at least a test phase and a scanning display phase according to the display control signal, and generates a phase determining signal indicating whether or not in the test phase, wherein the test phase is a part of a period wherein the display panel circuit is not executing the scanning display operation; a driving stage circuit, which includes a driving switch circuit; and a driving logic circuit, which is configured to operably perform the following driving operations according to the display control signal and the phase determining signal: (A) when the scanning display phase exists, generating a switch control signal according to the display control signal during the scanning display phase, to control the driving switch circuit of the driving stage circuit to switch the driving voltage and/or the driving current for generating the display driving signal to drive the panel load line such that the display panel circuit performs the scanning display operation; and (B) during a partial time period within the test phase, generating the switch control signal according to a test instruction to control the driving switch circuit of the driving stage circuit to switch the driving voltage and/or the driving current for generating the test driving signal to drive the panel load line for testing a failure item of the display panel circuit, wherein the test instruction is a pre-determined test instruction or a programmable test instruction.

From another perspective, the present invention provides a driving method, driving method for driving a display apparatus, wherein the display apparatus includes a display panel circuit configured to operably execute a scanning display operation, the display panel circuit including a panel load line, and the panel load driving signal being coupled to the panel load line of the display panel circuit of the display apparatus, the driving method including: generating a panel load driving signal according to a display control signal generated by a timing control circuit and a driving voltage and/or a driving current generated by a driving power circuit; and coupling the panel load driving signal to the panel load line to drive the display panel circuit, wherein the panel load driving signal includes a test driving signal and a display driving signal; wherein the step of generating panel load driving signal includes: determining at least a test phase according to the display control signal, or determines at least a test phase and a scanning display phase according to the display control signal; and performing the following driving operations according to the display control signal: (A) when the scanning display phase exists, during the scanning display phase, switching the driving voltage and/or the driving current for generating the display driving signal to drive the panel load line such that the display panel circuit performs the scanning display operation; and (B) during a partial time period within the test phase, switching the driving voltage and/or the driving current for generating the test driving signal to drive the panel load line for testing a failure item of the display panel circuit, wherein the test instruction is a pre-determined test instruction, or a programmable test instruction.

In one embodiment, the driving method further includes: detecting an electrical characteristic of the panel load line during a partial time period within the test phase according to the test instruction to generate a detection comparison result; determining whether the failure item exists according to the detection comparison result; generating a failure state flag corresponding to the determination of the existence of the failure item; and when the failure state flag indicates the existence of the failure item, stopping generating the display driving signal such that the display panel circuit stops the scanning display operation.

In one embodiment, the driving method further includes: detecting an electrical characteristic of the panel load line during a partial time period within the scanning display phase according to the test instruction to generate a detection comparison result; determining whether the failure item exists according to the detection comparison result; and generating a failure state flag corresponding to the determination of the existence of the failure item.

In one embodiment, the display apparatus further comprises another driving stage circuit requiring protection, wherein the display panel circuit further includes another panel load line requiring protection, wherein the driving stage circuit requiring protection and the panel load line requiring protection need to avoid receiving the test driving signal; the driving stage circuit requiring protection being configured to operably generate another panel load driving signal requiring protection according to the display control signal, and the panel load driving signal requiring protection being coupled to the panel load line requiring protection to drive the display panel circuit to perform the scanning display operation; the driving method further comprising: masking the display control signal during the test phase to stop generating the panel load driving signal requiring protection, such that the display panel circuit stops the display driving operation.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 1:
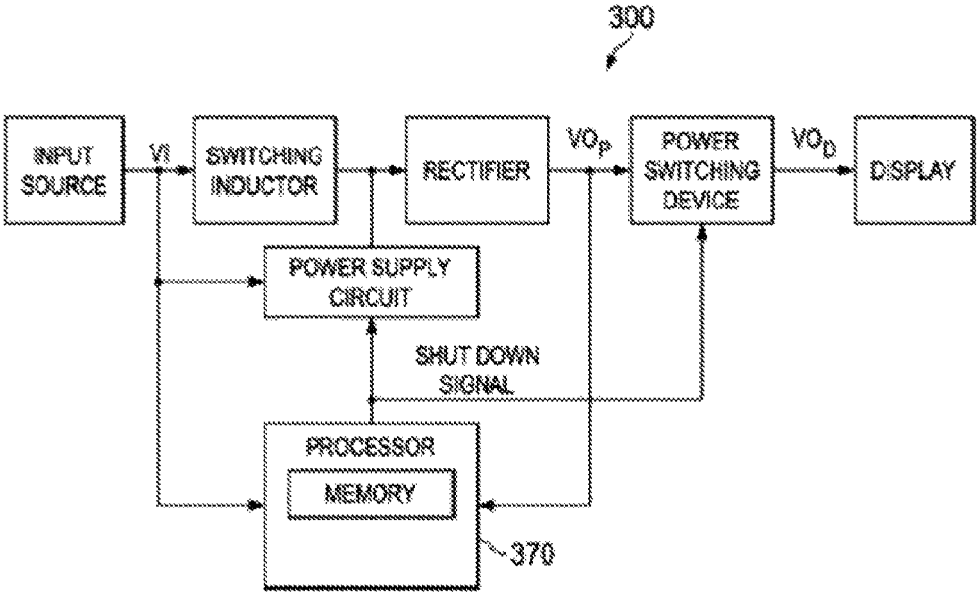
FIG. 1 shows a block diagram of a prior art display apparatus with short-circuit protection.
Figure 2:
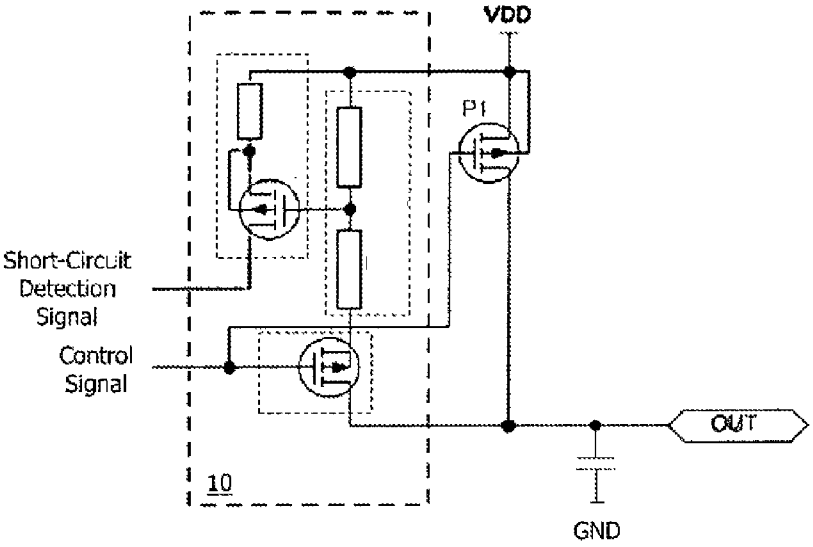
FIG. 2 shows a schematic diagram of a prior art short-circuit detection circuit for a display apparatus.
Figure 3:
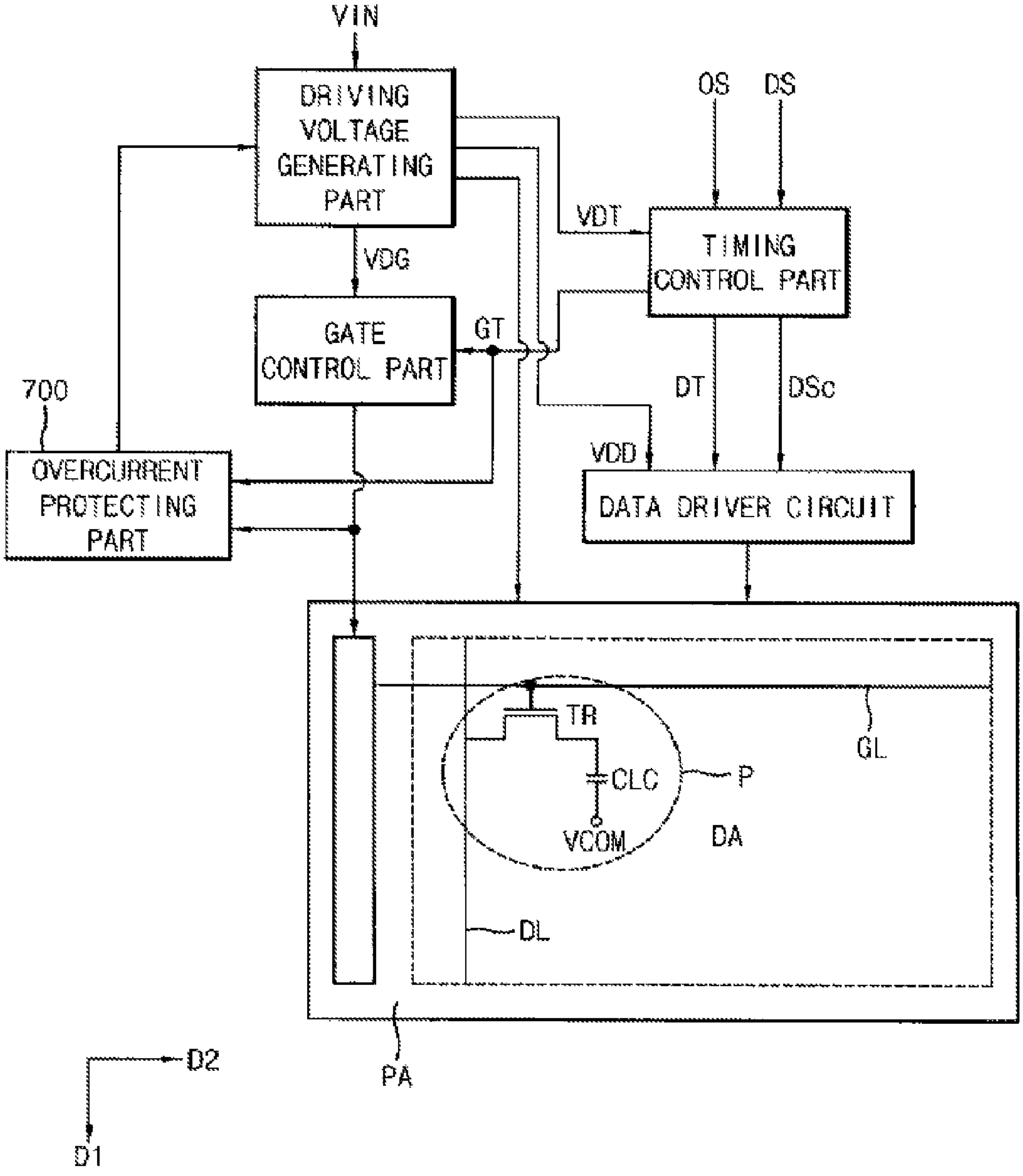
FIG. 3 shows a schematic diagram of a prior art display apparatus with over current protection.
Figure 4A:
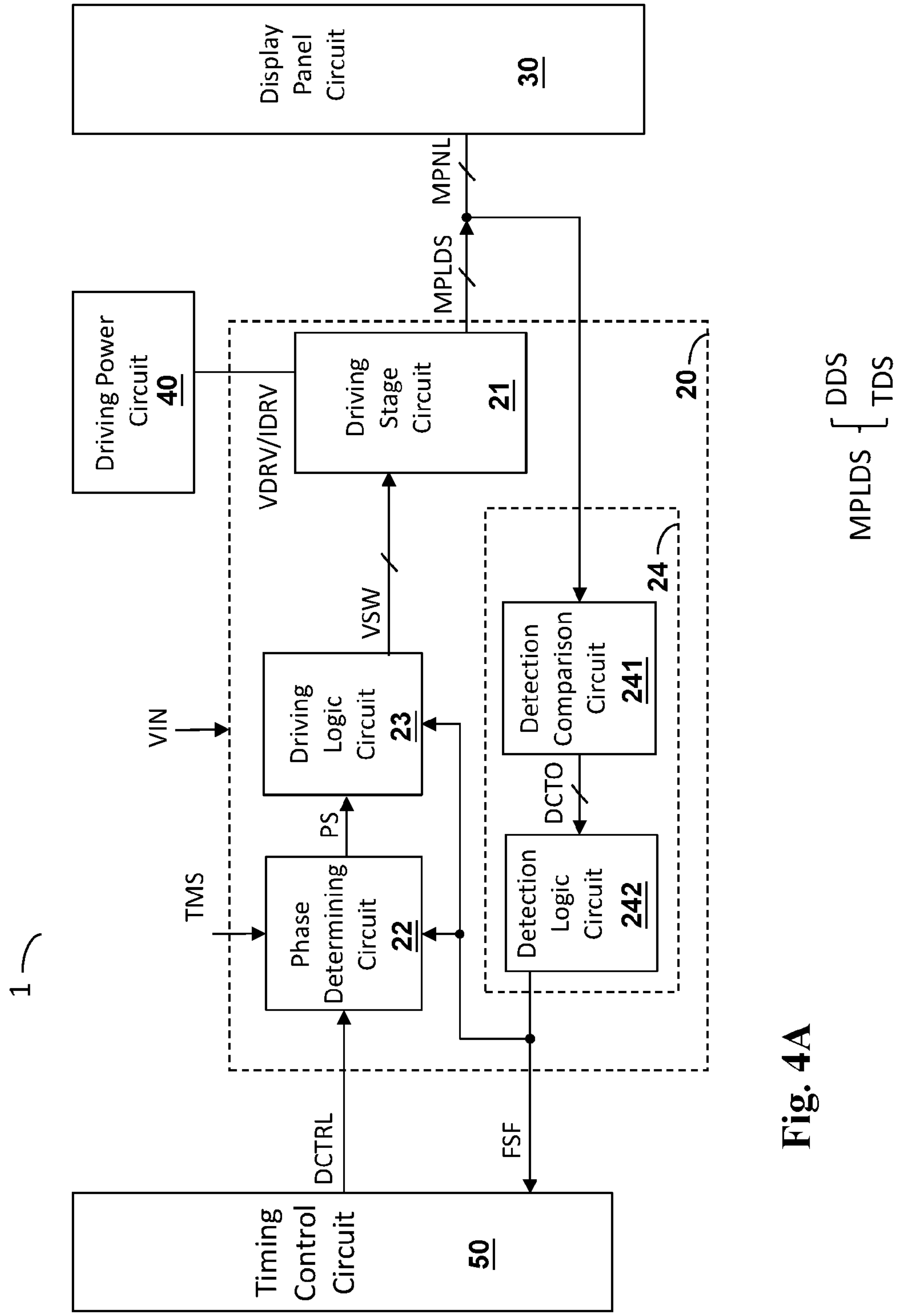
FIG. 4A shows a block diagram of an embodiment of the display apparatus with testing functions according to the present invention.

FIG. 4A shows one embodiment of the display apparatus according to the present invention (display apparatus 1). The display apparatus 1 comprises a display panel circuit 30 (for example but not limited to a TFT LCD display panel) and a panel driving circuit 20, wherein the panel display driver circuit 20 includes a driving stage circuit 21, and the display panel circuit 30 includes a panel load line MPNL. The panel display driver circuit 20 controls the driving stage circuit 21 according to a display control signal DCTRL generated by a timing control circuit 50, to switch a driving voltage VDRV and/or a driving current IDRV generated by a driving power circuit 40 and generate a panel load driving signal MPLDS which is sent onto the panel load line MPNL for driving the display panel circuit 30. The display panel circuit 30 is configured to execute a scanning display operation; in the scanning display operation, the display panel circuit 30 may display images by for example but not limited to scanning display lines or scanning display frames.

Figure 4B:
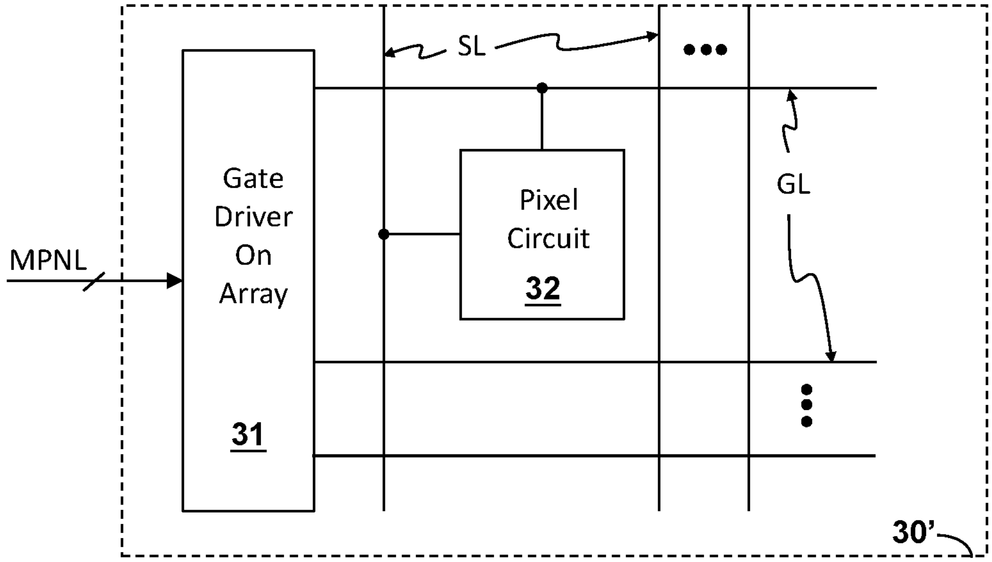
FIG. 4B shows a schematic diagrams of an embodiment of the display panel circuit of the display apparatus with testing functions according to the present invention.

In one embodiment, the display load line MPNL may be for example but not limited to a gate line GL or a source line SL of the LCD display panel. In one embodiment wherein the display panel circuit includes a gate-driver on array GOA 31 (the display panel circuit 30' shown in FIG. 4B), the display panel load line MPNL may be a gate driving input signal of the gate-driver on array GOA 31, wherein the gate driving input signal may be for example but not limited to an input signal of a shift register (not shown) of the GOA 31.

The panel load line MPNL or other components of the display panel circuit may have defects such as short circuit or leakage, which for example may be caused by the manufacturing process. Certain defective display panels may be detected and screened out by testers during the manufacturing process. However, there are still a certain ratio of defective display panels that cannot be detected and screened out during the manufacturing process due to for example the limitation of the aforementioned prior art. These defects may become worse due to for example but not limited to high voltages applied on the panel load line MPNL or other components for a period of usage time, and lead to failures such as short circuit; in some severe conditions, such a failure may cause smoke or flames to put users in danger. To solve this problem, the present invention provides a method for detecting failures, which can be performed continuously during the usage of the display panel to ensure safety of the users, and the method can detect more types of failure items with higher detection sensitivity.

Referring to FIG. 4A, in the display apparatus 1 of the present invention, the panel load driving signal includes a test driving signal TDS and a display driving signal DDS, wherein the test driving signal TDS and the display driving signal DDS may exist in the panel load driving signal MPLDS in parallel (co-existing at the same time) or in series (in time-divided arrangement). The panel display driver circuit 20 further includes a phase determining circuit 22, a driving logic circuit 23 and a detection and determination circuit 24.

The phase determining circuit 22 determines at least a test phase, and may also determine a scanning display phase. That is, more specifically, the display panel circuit 30 may perform testing during when the display apparatus 1 is in use, or when the display apparatus 1 is not in use. When performing testing while the display apparatus 1 is not in use, the phase determining circuit 22 is only required to determine whether to enter a test phase or not. When performing testing while the display apparatus 1 is in use, the phase determining circuit 22 may determine whether to enter the test phase or to enter the scanning display phase. When performing testing while not in use, the aforementioned display driving signal DDS may be null or may be omitted (non-existing). The phase determining circuit 22 may generate a phase determining signal PS which includes at least a first state and a second state, wherein the first state represents the aforementioned test phase, and the second state represents the scanning display phase or not being in the test phase. In one embodiment, the phase determining signal may be a digital signal, with its high and low levels representing the aforementioned two states respectively.

In accordance with the display control signal DCTRL and the phase determining signal PS, the driving logic circuit 23 performs the following driver operations: (A) when a scanning display phase exists, in the scanning display phase, generating a switch control signal VSW according to the display control signal DCTRL, to control a driving switch circuit (not shown) of the driving stage circuit 21 to switch the driving voltage and/or the driving current for generating the display driving signal DDS to drive the panel load line MPNL such that the display performs the scanning display operation; (B) in the test phase, generating the switch control signal VSW according to a test instruction, to control a driving switch circuit (not shown) of the driving stage circuit 21 to switch the driving voltage and/or the driving current for generating the test driving signal TDS to drive the panel load line MPNL for testing a failure item (such as an electrical characteristic) of the display panel circuit 30. The test phase is a part of a period wherein the display panel circuit 30 is not executing the scanning display operation. The test phase can be embodied in various ways, which will be described in detail later. In the test phase, the detection and determination circuit 24 detects an electrical characteristic of the panel load line according to the test instruction for determining whether the failure item exists, and generates a latched failure state flag FSF in correspondence with the determination of the existence of the failure item.

The aforementioned test instruction may be a pre-determined test instruction, or a programmable test instruction which is adjustable. In one embodiment, the test instruction may be a built-in test instruction within the display apparatus (for example, stored within the phase determining circuit 22 or the driving logic circuit 23). In one embodiment, the test instruction may be generated according to a test mode signal (TMS) as shown in FIG. 4A. In addition, the test instruction may be a test instruction group including plural instructions corresponding to different test phases. The test instruction may include for example but not limited to the following contents: starting time and period of the test driving signal TDS, starting time and period for detection, driving modes and detection modes for the test, types of failure items, criteria for determining failure items, and actions to be taken in correspondence with various failure items.

The aforementioned electrical characteristic for example includes: a load line voltage of the panel load line MPNL, and/or a load line voltage change rate of the panel load line MPNL, and/or a load line current of the panel load line MPNL, and/or a load line current change rate of the panel load line MPNL.

The aforementioned detection and determination circuit determines the existence of the failure item of the display panel circuit 30 according to the detected electrical characteristic, wherein the failure item may be for example but not limited to a failure related to the panel load line MPNL, such as short circuit, leakage, over voltage, over current, and abnormal changes in impedance, etc.

In one embodiment, in accordance with the latched failure state flag FSF, the display apparatus according to the present invention may perform corresponding protection actions, for example but not limited to controlling the display panel circuit 30 to stop the scanning display operation, or controlling the driving stage circuit 21 by the driving logic circuit 23 to stop generating the panel load driving signal MPLDS onto the panel load line MPNL, or controlling the driving power circuit 40 to stop generating the driving voltage VDRV and/or the driving current IDRV, or reporting the failure to a front stage circuit, for example but not limited to the timing control circuit 50, such that the front stage circuit takes protection actions corresponding to the failure item, or redundancy repair.

Referring to FIG. 4A, in one embodiment, the detection and determination circuit 24 includes a detection comparison circuit 241 and a detection logic circuit 242, wherein the detection comparison circuit 241 detects the electrical characteristic to generate a detection comparison result DCTO during one or more partial time periods within the test phase. In one embodiment, the detection comparison circuit 241 determines multiple electrical characteristics of the load line during the test phase to obtain a combination of electrical characteristics, and compares the combination of electrical characteristics with a failure electrical characteristic threshold to generate the detection comparison result DCTO, wherein the combination of electrical characteristics includes for example but not limited to a function of the load line voltage, the load line current, and/or the change rate thereof. For example, the combination of electrical characteristics may be a load line impedance which can be calculated from the load line voltage and the load line current. In addition, in one embodiment, the detection comparison result DCTO does not only include information about the aforementioned comparison between the electrical characteristic and the corresponding threshold, but also include information about time, such as the period of time from when the detection comparison result DCTO exceeds the threshold, or include information about number of times, such as a count of the number of times that the detection comparison result DCTO exceeds the threshold.

The detection logic circuit 242 determines the failure item of the panel load line MPNL according to the aforementioned detection comparison result DCTO, and generates the aforementioned latched failure state flag FSF according to the failure item.

The latched failure state flag FSF may be set according to, for example but not limited to, a function such as a logic operation of all the detection comparison results. In one embodiment, the latched failure state flag FSF may be set to indicate a failure when an accumulated count of the detection comparison result DCTO showing a failure exceeds a count threshold.

Note that in one embodiment of the display apparatus of the present invention, the detection and determination circuit 24 may be omitted. In this case, the panel driving circuit 20 can generate the test driving signal TDS during the test phase to generate graphical patterns on the display panel, and the failure item may be determined according to the generated graphical patterns.

Also note that the display apparatus of the present invention can detect and determine failure items not only during or after the time period when the test driving signal TDS is driving the panel load line MPNL in the test phase, in one embodiment, the detection and determination circuit 24 can also detect the electrical characteristic over the panel load line and determines the failure item during the scanning display phase.

Figure 5:
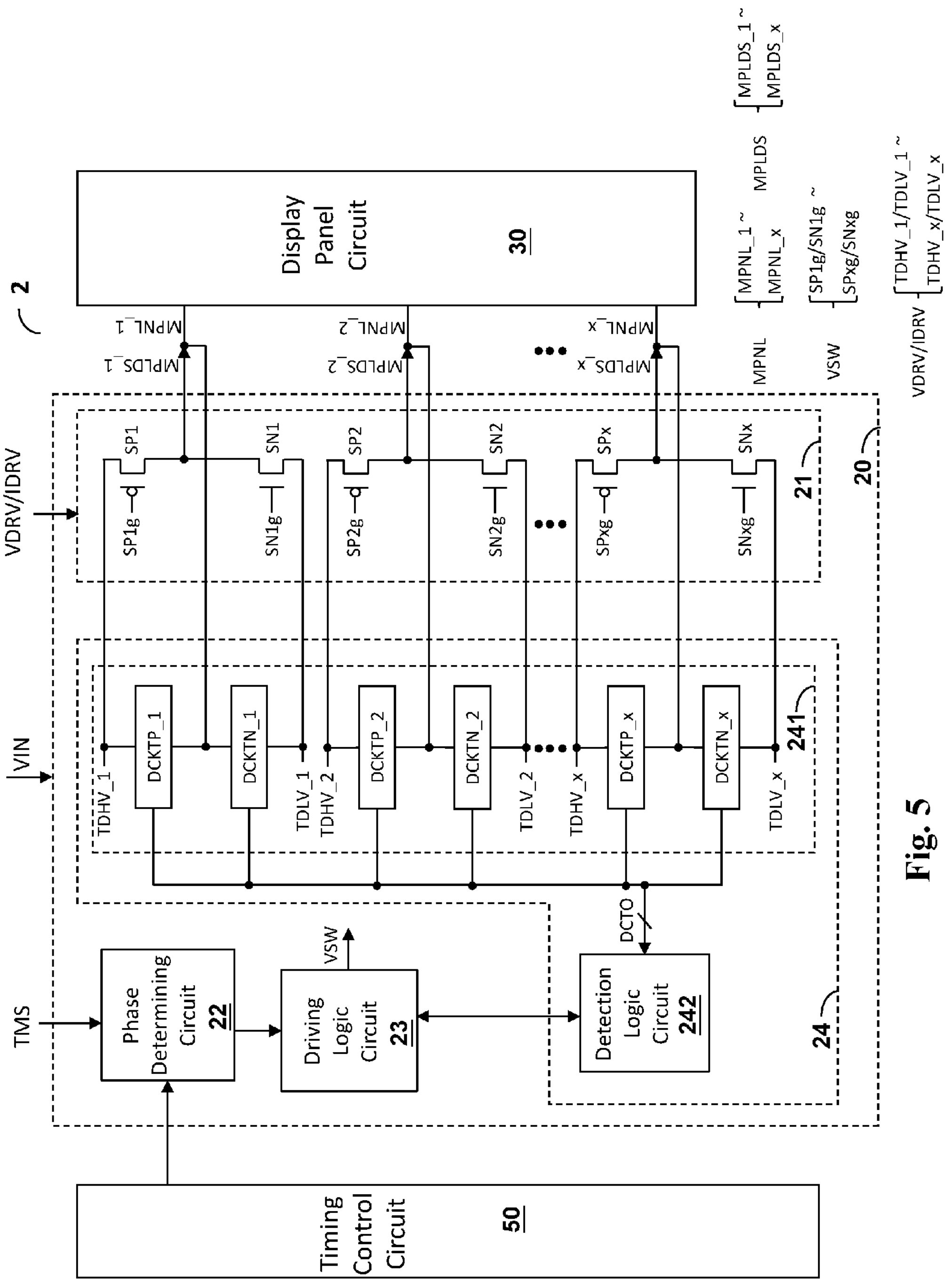
FIG. 5 shows a schematic diagram of a more specific embodiment of the display apparatus with testing functions according to the present invention.

FIG. 5 shows a more specific embodiment of the display apparatus according to the present invention (display apparatus 2). In this embodiment, the panel load line MPNL includes MPNL_1~MPNL_x, (x being a natural number, the same hereinafter); the driving voltage VDRV includes TDHV_1/TDLV_1~TDHV_x/TDLV_x (TDHV_1~TDHV_x are higher voltage levels while TDLV_1~TDLV_x are lower voltage levels or negative voltage levels); the panel load driving signal MPLDS includes MPLDS_1~MPLDS_x; the switch control signal VSW includes SP1*g*/SN1*g*~SPxg/SNxg. The driving switch circuit of the driving stage circuit 21 includes positive driving switches SP1~SPx and negative driving switches SN1~SNx, wherein the positive driving switches SPx and negative driving switches SNx which are connected in pair respectively are configured to switch the driving voltage TDHV_1~TDHV_x and TDLV_1~TDLV_x to generate the panel load driving signal MPLDS_1~MPLDS_x on the panel load lines MPNL_1~MPNL_x respectively during one or more partial time periods in the test phase. TDHV_1~TDHV_x may have the same or different voltage levels, and TDLV_1~TDLV_x may have the same or different voltage levels. In one embodiment, TDHV_1~TDHV_x are connected to a same voltage source and have a same higher voltage level, and TDLV_1~TDLV_x are connected to another voltage source and have a same lower voltage level.

Referring to FIG. 5, the driving stage circuit 21 operates as the following: (A) During one or more partial time periods of the scanning display phase, the driving stage circuit 21 controls the positive driving switches SP1~SPx and the negative driving switches SN1~SNx through the switch control signal VSW (in this embodiment, VSW includes the switch control signals SP1*g*~SPxg and SN1*g*~SNxg which controls the corresponding the positive driving switches SP1~SPx and the negative driving switches SN1~SNx respectively, the same hereinafter) to switch the driving voltages TDHV_1~TDHV_x and TDLV_1~TDLV_x to generate the display driving signals DDS_1~DDS_x (corresponding to the aforementioned DDS, not shown) for driving panel load lines MPNL_1~MPNL_x such that the display panel circuit 30 performs the scanning display operation. (B) During a partial time period of the test phase, the driving stage circuit 21 controls the positive driving switches SP1~SPx and the negative driving switches SN1~SNx through the switch control signals SP1*g*~SPxg and SN1*g*~SNxg to switch the driving voltage groups TDHV_1~TDHV_x and TDLV_1~TDLV_x for generating the test driving signals TDS_1~TDS_x (corresponding to the aforementioned TDS, not shown) to drive the panel load lines MPNL_1~MPNL_x for testing the electrical characteristic of the display panel circuit 30.

Referring to FIG. 5, in a more specific embodiment, the detection comparison circuit 241 includes positive detection circuits DCKTP_1~DCKTP_x which corresponds to the positive driving switches SP1~SPx respectively and the negative detection circuits DCKTN_1~DCKTN_x which corresponds to the negative driving switches SN1~SNx respectively. During a partial time period of the test phase, the positive detection circuits DCKTP_1~DCKTP_x and the negative detection circuits DCKTN_1~DCKTN_x detect the electrical characteristic of the corresponding panel load line and generate the detection comparison result DCTO. In one embodiment, the positive detection circuits DCKTP_1~DCKTP_x and the negative detection circuits DCKTN_1~DCKTN_x generate the detection comparison result DCTO further according to the driving voltages TDHV_1~TDHV_x and TDLV_1~TDLV_x respectively.

Figure 6A:
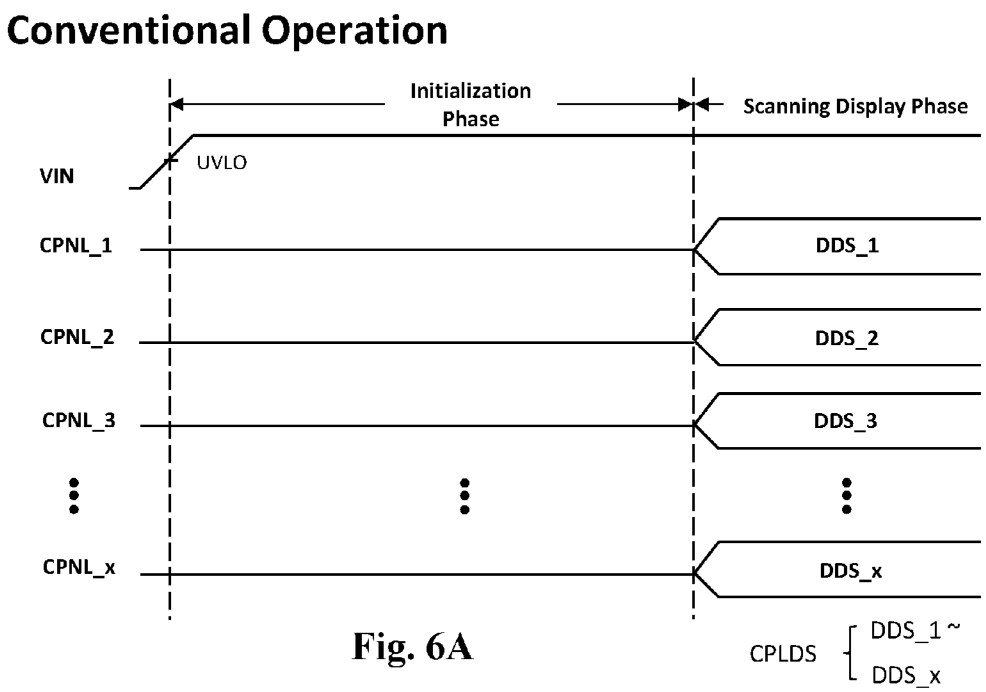
FIG. 6A shows simulation waveforms of a prior art.

In one embodiment, the test phase may be a partial or the whole period of an initialization phase of the display apparatus (for example but not limited to the display apparatus 1 and 2 in FIGS. 4A and 5). As shown in FIG. 6A, the initialization phase means a period of time which starts from when a power source (for example VIN) of the display apparatus rises above a pre-determined operational voltage threshold UVLO and ends at a starting time of a first time execution of the scanning display phase. In general, an initialization phase is required (such as for setting initial parameters, power-up, etc.) for the driving circuits and the front-stage/post-stage circuits to be ready for operations.

Figure 6B:
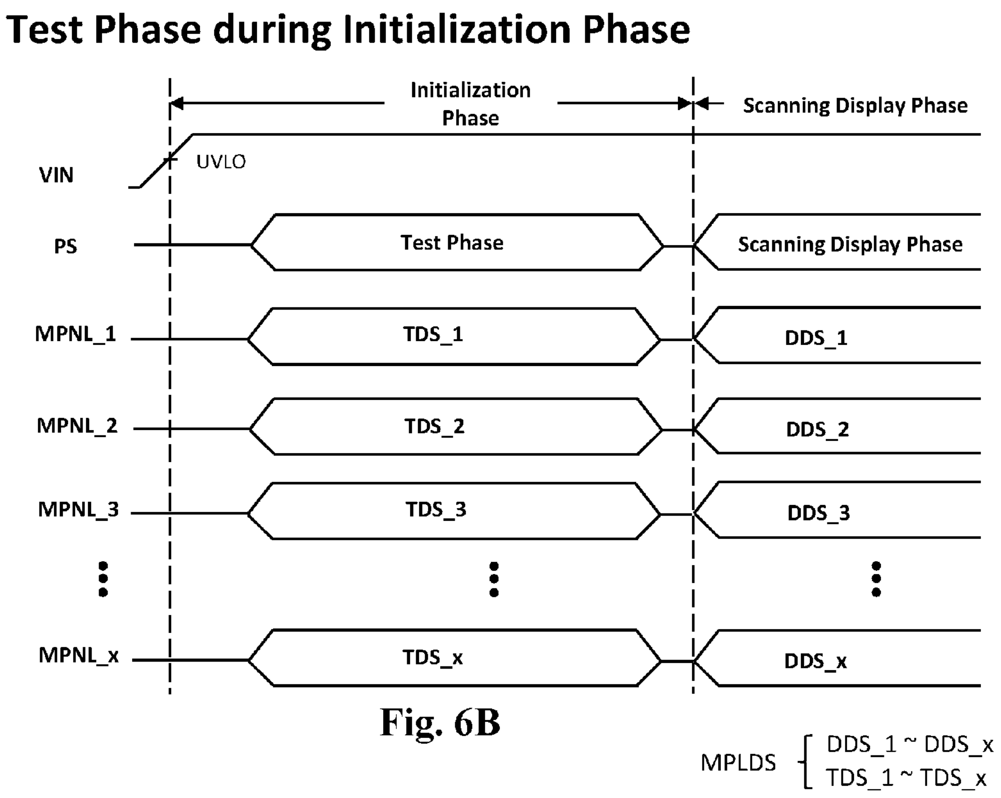
FIG. 6B shows simulation waveforms of the display apparatus with testing functions according to the present invention.

FIG. 6B shows simulation waveforms of the display apparatus according to the present invention. As shown in the figure, the test phase of this embodiment is a partial time period of the initialization phase of the display apparatus (such as the display apparatus 1 and 2 in FIGS. 4A and 5). Also as shown in the figure, during the test phase, the display apparatus according to the present invention generates test driving signals TDS_1~TDS_x onto the corresponding panel load lines MPNL_1~MPNL_x respectively, and detects and determines the electrical characteristics and the failure items.

Figure 7A:
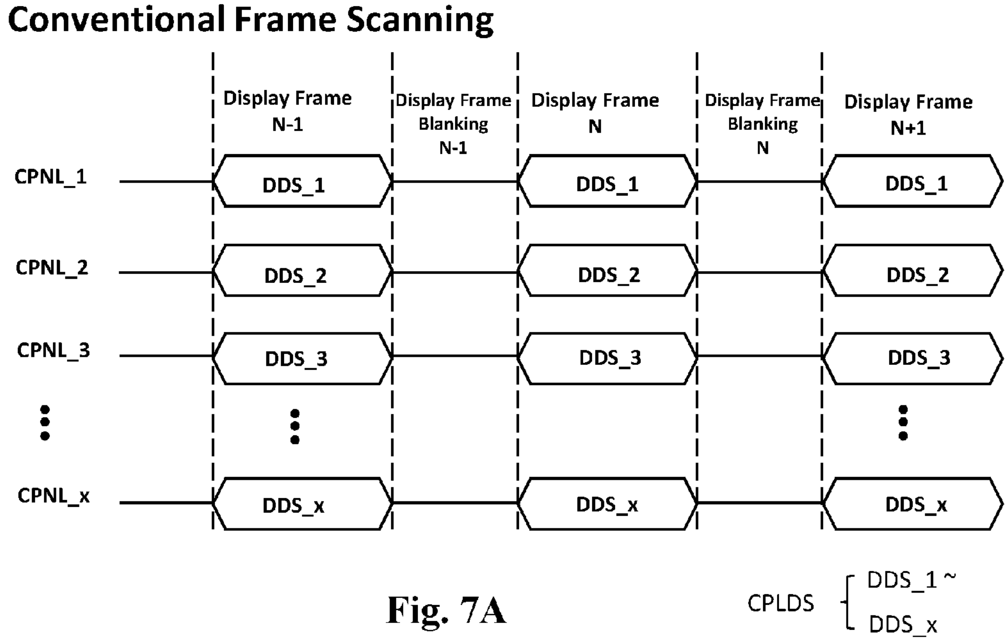
FIG. 7A shows simulation waveforms of a prior art.

In one embodiment, the test phase of the display apparatus of the present invention may be a partial or the whole of a blanking period between scanning display operations. The aforementioned “blanking period” may be for example but not limited to a display frame blanking period (blanking period between display frames) and/or a scanning line blanking period (blanking period between scanning lines). As an example shown in FIG. 7A, the display frame blanking period n-1 means a period of time which starts from when the display apparatus finishes scanning displaying the display frame n-1 and ends at when the display apparatus starts to scanning display the display frame n, wherein the n is a natural number; likewise for the display frame blanking period n and so on. Similarly, the scanning line blanking period m-1 means a period of time which starts from when the display apparatus finishes scanning displaying the scanning line m-1 and ends at when the display apparatus starts to scanning display the scanning line m, wherein the m is a natural number; likewise for the scanning line blanking period m and so on. In general, the display apparatus does not perform scanning display operation during the blanking period.

Figure 7B:
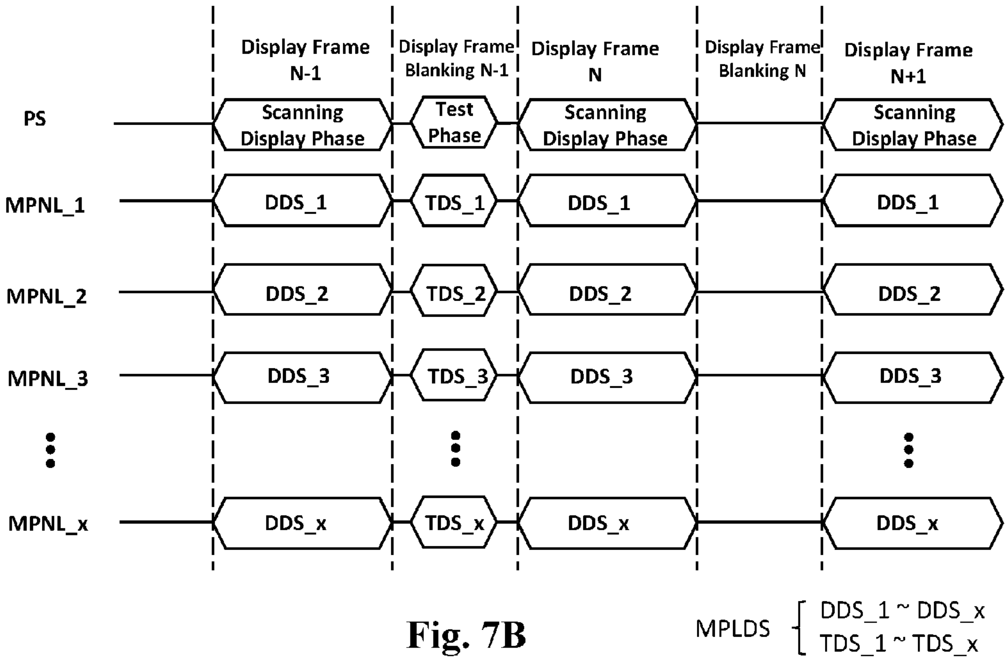
FIG. 7B shows simulation waveforms of the display apparatus with testing functions according to the present invention.

FIG. 7B shows simulation waveforms of one embodiment of the display apparatus (such as the display apparatus 1 and 2 in FIGS. 4A and 5) according to the present invention. As shown in FIG. 7B, in this embodiment, the display frame n-1 includes a test phase and the display apparatus generates test driving signals TDS_1~TDS_x onto the corresponding panel load lines MPNL_1~MPNL_x respectively, and detects and determines the electrical characteristics and the failure items during the test phase. In one embodiment, the display apparatus according to the present invention may include plural test phases during plural blanking periods.

In one embodiment, the display control signal DCTRL includes a display frame synchronization signal or a scanning line synchronization signal, wherein the starting and the ending time of the display frame blanking period may be determined according to the display frame synchronization signal, and the starting and the ending time of the scanning line blanking period may be determined according to the scanning line synchronization signal.

Figure 8:
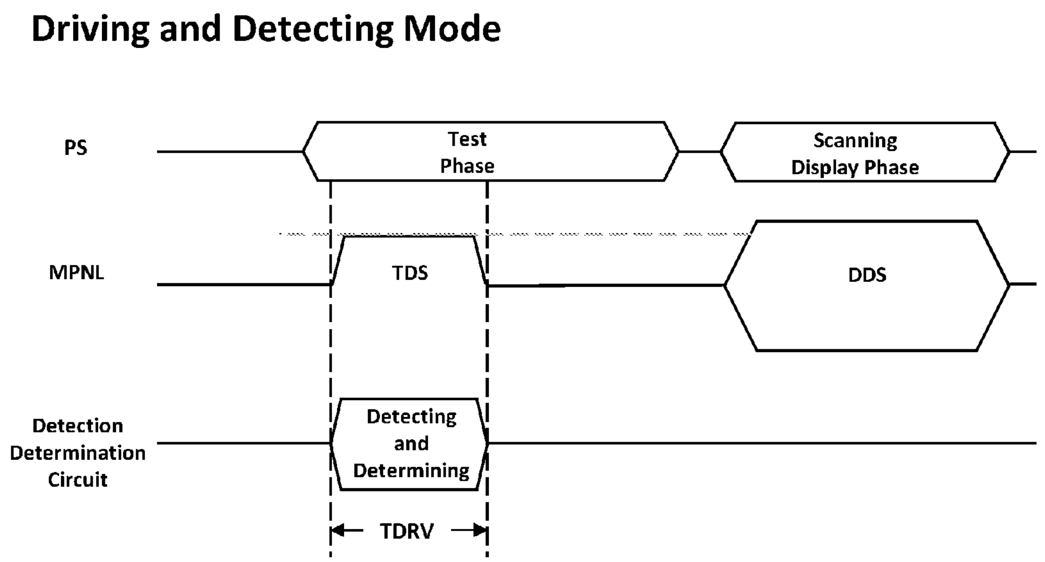
FIGS. 8-11 show simulation waveforms of the display apparatus with testing functions according to the present invention.

In one embodiment, the test phase of the display apparatus according to the present invention includes a "Driving and Detecting Mode". Referring to FIG. 8, when the display apparatus according to the present invention is in the Driving and Detecting Mode, the driving stage circuit (for example but not limited to the driving stage circuit 21 in FIGS. 4A and 5) generates the test driving signal TDS to drive the panel load line MPNL during a partial time period of the test phase (for example but not limited to TDRV in FIG. 8), and the detection and determination circuit (for example but not limited to the detection and determination circuit 24 in FIGS. 4A and 5) detects the electrical characteristic and determines the failure item of the panel load line MPNL during the period TDRV. The panel load lines that the detection and determination circuit is detecting may or may not correspond to the panel load lines driven by the test driving signal. For example, in the display apparatus as shown in FIG. 5, in one embodiment, the panel load line MPNL_1 is driven by the test driving signal TDS_1 during the period TDRV, and the detection and determination circuit also detects the electrical characteristic and the failure item of the panel load line MPNL_1 at the same time during the period TDRV. In one embodiment, the panel load line MPNL_1 is driven by the test driving signal TDS_1 during the period TDRV, while the detection and determination circuit detects the electrical characteristic and the failure item of another panel load line (for example but not limited to panel load line MPNL_2) during the period TDRV. Besides, as illustrated by the lateral dashed line shown in FIG. 8, in one embodiment, the level of the test driving signal TDS may be different from the level of the display driving signal DDS.

Figure 9:
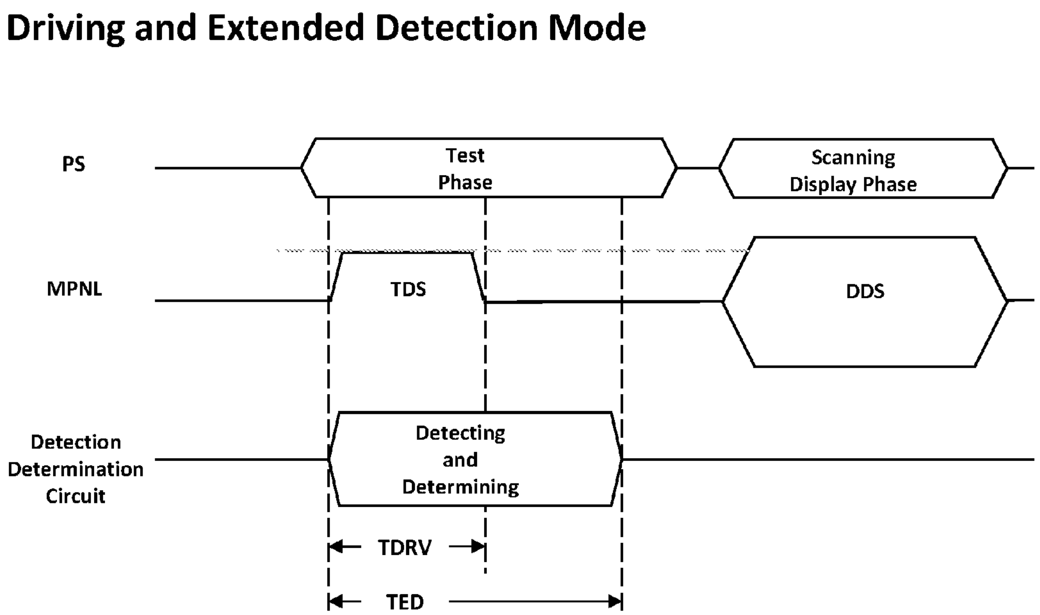

In one embodiment, the test phase of the display apparatus according to the present invention may include a "Driving and Extended Detection Mode". Referring to FIG. 9, when the display apparatus according to the present invention is in the Driving and Extended Detection Mode, the driving stage circuit (for example but not limited to the driving stage circuit 21 in FIGS. 4A and 5) generates the test driving signal TDS to drive the panel load line MPNL during a partial time period of the test phase (for example but not limited to the period TDRV in FIG. 9), while the detection and determination circuit (for example but not limited to the detection and determination circuit 24 in FIGS. 4A and 5) detects the aforementioned electrical characteristic and determines the failure item during another partial time period of the test phase (for example the period TED shown in FIG. 9), wherein the period TED preferably includes the period TDRV and an extended time period. The panel load lines that the detection and determination circuit is detecting may or may not correspond to the panel load lines driven by the test driving signal. For example, in the display apparatus as shown in FIG. 5, in one embodiment, the panel load line MPNL_1 is driven by the test driving signal TDS_1 during the period TDRV, and the detection and determination circuit also detects the electrical characteristic and the failure item of the panel load line MPNL_1 during the period TED. In one embodiment, the panel load line MPNL_1 is driven by the test driving signal TDS_1 during the period TDRV, while the detection and determination circuit detects the electrical characteristic and the failure item of another panel load line (for example but not limited to the panel load line MPNL_2) during the period TED.

Figure 10:
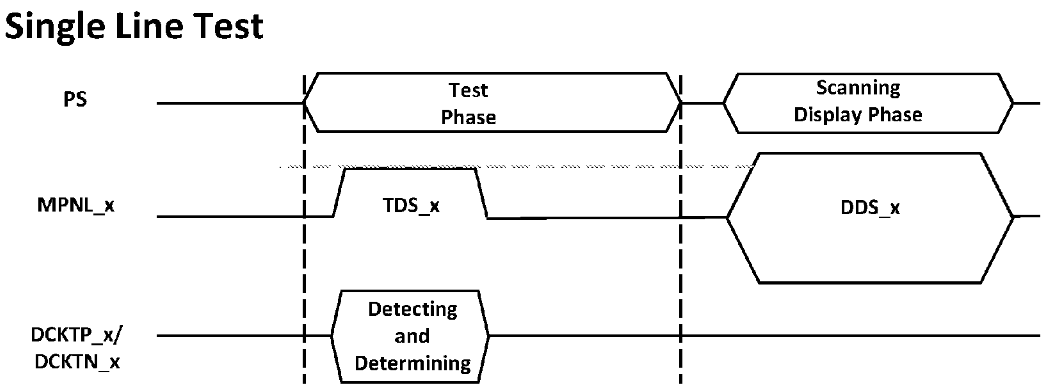

During the test phase, the display apparatus of the present invention may apply test driving signal TDS onto a single or plural panel load lines for testing and perform detection and determination over the same single or plural panel load lines. For example, referring to FIG. 10, the test phase of the display apparatus according to the present invention may include a "Single Line Test". The driving stage circuit applies test driving signals TDS_x onto panel load line MPNL_x during the test phase, and the detection circuit DCKTP_x/DCKTN_x detect the panel load line MPNL_x, wherein the time periods for driving and detecting may be configured as in the "Driving and Detecting Mode" or the "Driving and Extended Detection Mode".

Figure 11:
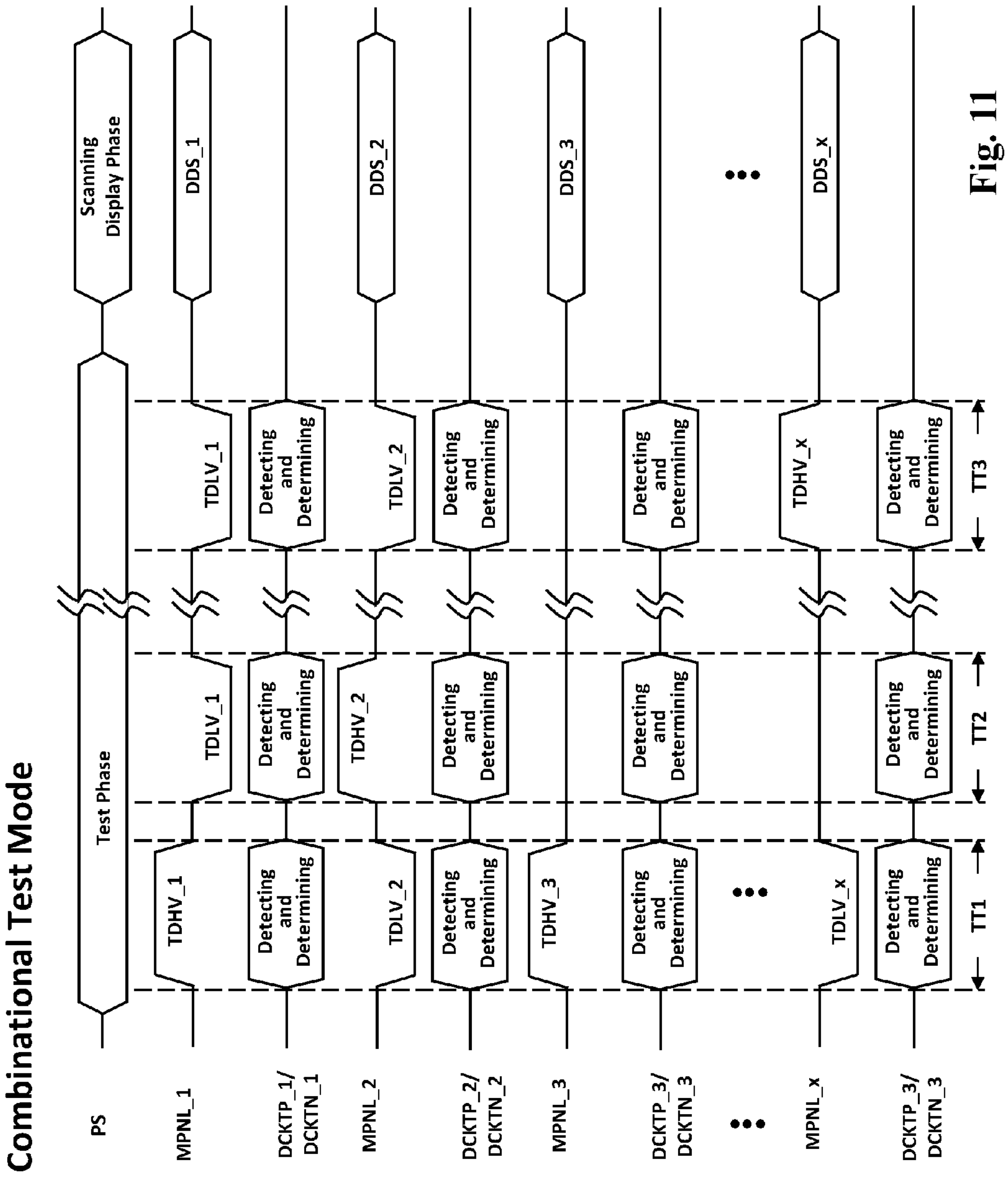

In one embodiment, the test phase of the display apparatus according to the present invention may include a "Combinational Test Mode". The driving stage circuit applies one or plural test driving signals TDS onto corresponding one or plural panel load lines MPNL during the test phase, and one or plural detection circuits (for example but not limited to the positive detection circuit/negative detection circuit) of the detection and determination circuit perform detection on the one or plural panel load lines MPNL. The one or plural panel load lines that the detection and determination circuit is detecting may or may not correspond to the one or plural panel load lines driven by the test driving signal. The time periods for driving and detecting may be configured as in the "Driving and Detecting Mode" or the "Driving and Extended Detection Mode". For example, referring to FIG. 11, during the test phase, the panel load lines MPNL_1, MPNL_2, MPNL_3, and MPNL_x are driven by panel load driving signals MPLDS_1, MPLDS_2, MPLDS_3, and MPLDS_x and configured as in the "Driving and Detecting Mode" or the "Driving and Extended Detection Mode". During the period TT1, the driving levels of the panel load driving signals MPLDS_1, MPLDS_2, MPLDS_3, and MPLDS_x are TDHV_1, TDLV_2, TDHV_3, and TDLV_x, respectively, and at the same time the detection and determination circuit performs detection and determination. And during the period TT2, the driving levels of the panel load driving signals MPLDS_1 and MPLDS_2 are TDHV_1 and TDLV_2, respectively, while the panel load lines MPNL_3 and MPNL_x are not driven by the test driving signals, but the corresponding detection circuits DCKTP_3/DCKTN_3 and DCKTP_x/DCKTN_x still perform detection during the period TT2. Thus, for example, one can detect how one or plural panel load lines which are not driven by the test driving signals are affected by the test driving signals applied onto one or more other panel load lines. During the period TT3, another test may be performed.

This embodiment illustrates the advantages of the present invention. In the display apparatus of the present invention, the panel load lines are driven for test in a test phase which is a partial time period in the initialization phase and/or in the scanning blanking period during which the display apparatus does not perform scanning display operations, and hence, there is a much greater flexibility to design the test patterns; the test patterns may have a variety of types and combinations, and the electrical characteristics and failure items that can be detected are therefore very broad. For example, the test patterns can be designed such that a cross-line test is performed to increase the detection sensitivity; as a more specific example, referring to FIG. 11, during the period TT1, the levels of the test driving signals on the panel load lines MPNL_1 and MPNL_2 can be TDHV_1 and TDLV_2, respectively, wherein TDHV_1 is a higher voltage level while TDLV_2 is a lower voltage level or a negative voltage level. Thus, when there is a resistive defect between the panel load lines MPNL_1 and MPNL_2, the larger voltage difference between TDHV_1 and TDLV_2 can generate a larger (and thus more detectable) leakage current between the panel load lines MPNL_1 and MPNL_2, whereby the resistive defect between the panel load lines MPNL_1 and MPNL_2 can be more easily detected. Or as another example, referring to FIG. 11, during the period TT2, the panel load line MPNL_3 is only for detection (for read-out without being applied with any pattern), which may be the basis for detecting and determining other panel load lines (for example but not limited to MPNL_1 and MPNL_2) or for detecting and determining the same panel load line MPNL_3 with time delay. For an example of the latter, the panel load line MPNL_3 is driven by the test driving signal with a level of TDHV_3 during the period TT1, and the effect of the test driving signal on the panel load line MPNL_3 is detected and determined during the time period TT2. The delayed detection (applicable not only in this embodiment but also in other modes, such as the aforementioned "Driving and Extended Detection Mode") provides a way to determine a change rate of the detected electrical characteristic, such as a load line voltage change rate or a load line current change rate, and hence the present invention can is able to detect various more types of failure items.

Figure 12:
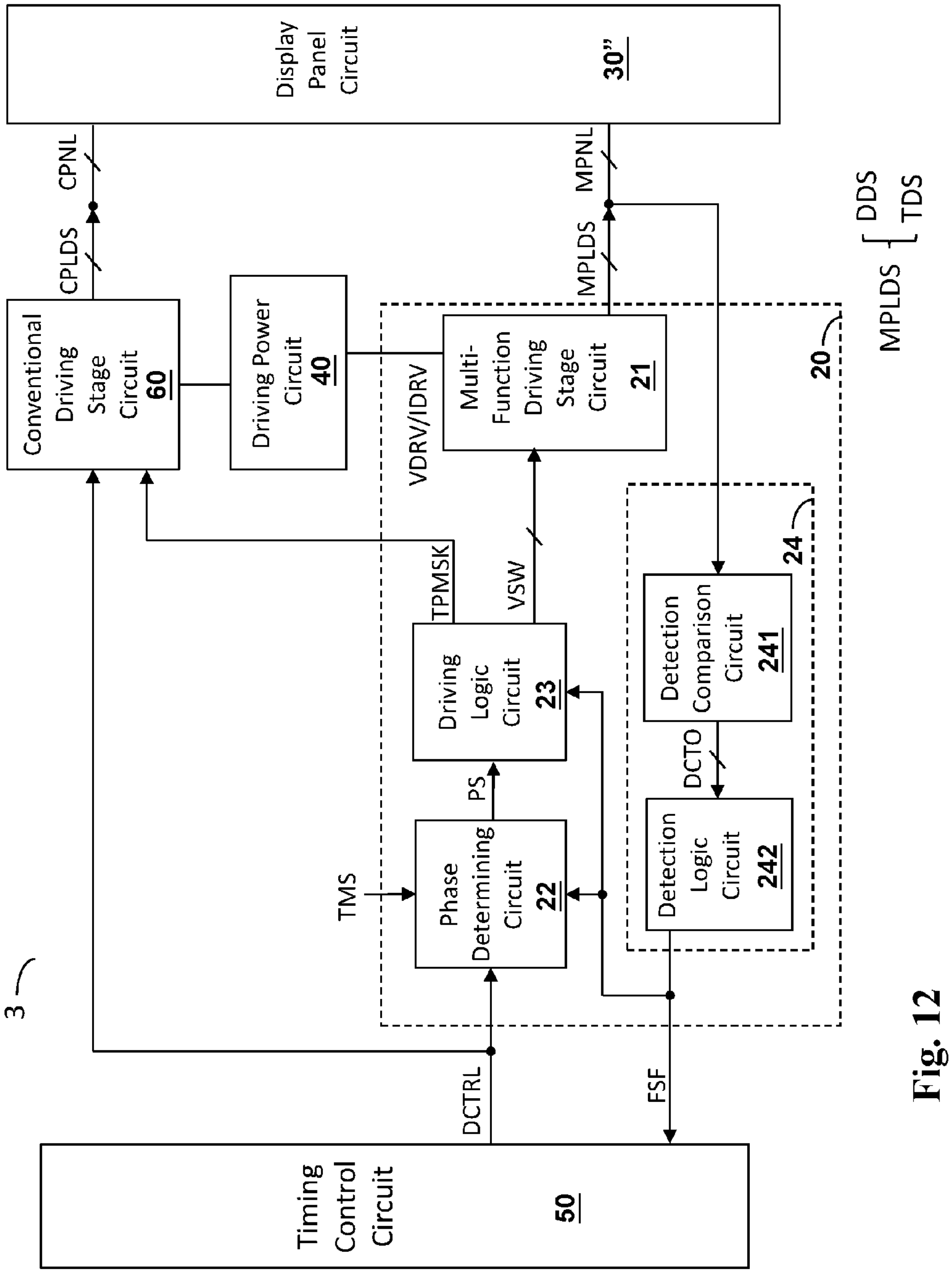
FIG. 12 shows a block diagram of an embodiment of the display apparatus with testing functions according to the present invention.

Referring to FIG. 12, in one embodiment, the display apparatus (display apparatus 3) according the present invention further includes a conventional driving stage circuit 60, and the display panel circuit 30" further includes a conventional panel load line CPNL. The term "conventional" means that the conventional panel load line CPNL and the conventional driving stage circuit include the display driving function but does not include the aforementioned test driving and detection and determination functions according to the present invention. Under such circumstance, if the conventional panel load line CPNL and the conventional driving stage circuit receive the various testing patterns of the present invention, it might cause unpredictable errors. Hence, it is better to protect the conventional panel load line CPNL and the conventional driving stage circuit from receiving the test patterns, and thus the conventional panel load line CPNL and the conventional driving stage circuit may also be referred to as "a panel load line requiring protection" and "a driving stage circuit requiring protection". The conventional driving stage circuit 60 generates a conventional panel load driving signal CPLDS onto the conventional panel load line CPNL according to the control signal DCTRL for driving the display panel circuit 30" to perform the display driving operation, wherein the conventional panel load driving signal CPLDS needs protection so that it does not include the various test driving signals. According to the present invention, during the test phase, a part of the display control signal DCTRL can be masked according to the test phase mask signal TPMSK, such that the conventional driving stage circuit 60 does not drive the display panel circuit 30" at designated periods, to avoid error operations such as random images, or to avoid conflicts with the control signal DCTRL.

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. As an example, test phases can be arranged both during the initialization phase and during the display frame blanking period, whereby the display apparatus may perform different testing operations during different test phases. As another example, the "Driving and Detecting Mode" and the "Driving and Extended Detection Mode" can be used together. In this case, the panel driving circuit should be correspondingly configured, as a combination of the aforementioned corresponding embodiments, to realize the combination of modes as mentioned above. Furthermore, those skilled in this art can readily conceive variations and modifications within the spirit of the present invention. For example, test phases are arranged in time periods within the initialization phase or the display frame blanking period in the aforementioned embodiments, while in another application which includes other types of display blanking period, such as a black (blank) frame which is displayed according to the setting by users, test phases can be arranged in such a black frame. As another example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. The spirit of the present invention should cover all such and other modifications and variations, which should be interpreted to fall within the scope of the following claims and their equivalents.

What is claimed is:

1. A display apparatus, comprising:

a display panel circuit which includes a panel load line, the display panel circuit being configured to operably execute a scanning display operation; and a panel driving circuit, configured to operably generate a panel load driving signal according to a display control signal generated by a timing control circuit and a driving voltage and/or a driving current generated by a driving power circuit, wherein the panel load driving signal is coupled to the panel load line to drive the display panel circuit, and the panel load driving signal includes a test driving signal and a display driving signal; the panel driving circuit including:

a phase determining circuit, which determines at least a test phase according to the display control signal, or determines at least a test phase and a scanning display phase according to the display control signal, and generates a phase determining signal indicating whether or not in the test phase, wherein the test phase is a part of a period wherein the display panel circuit is not executing the scanning display operation;

a driving stage circuit, which includes a driving switch circuit;

a driving logic circuit, which is configured to operably perform the following driving operations according to the display control signal and the phase determining signal:

(A) when the scanning display phase exists, generating a switch control signal according to the display control signal during the scanning display phase, to control the driving switch circuit of the driving stage circuit to switch the driving voltage and/or the driving current for generating the display driving signal to drive the panel load line such that the display panel circuit performs the scanning display operation; and (B) during a partial time period within the test phase, generating the switch control signal according to a test instruction to control the driving switch circuit of the driving stage circuit to switch the driving voltage and/or the driving current for generating the test driving signal to drive the panel load line for testing a failure item of the display panel circuit, wherein the test instruction is a pre-determined test instruction or a programmable test instruction; and a detection and determination circuit, configured to operably detect an electrical characteristic of the panel load line during the partial time period within the test phase according to the test instruction, for determining whether the failure item exists and generating a failure state flag in correspondence with the determination of the existence of the failure item; the detection and determination circuit including:

a detection comparison circuit, configured to operably detect the electrical characteristic to generate a detection comparison result; and a detection logic circuit, configured to operably determine whether the failure item exists according to the detection comparison result and generate the failure state flag;

wherein the driving stage circuit stops generating the display driving signal when the failure state flag indicates the existence of the failure item, such that the display panel circuit stops the scanning display operation.

2. The display apparatus of claim 1, wherein:

the electrical characteristic includes one or more of a load line voltage, a load line voltage change rate, a load line current, and/or a load line current change rate of the panel load line; and the failure item includes one or more of a short circuit, a leakage current, and/or an over current of the display panel circuit.

3. The display apparatus of claim 1, wherein the detection and determination circuit further detects the electrical characteristic of the panel load line for determining the existence of the failure item of the display panel circuit during a partial time period within the scanning display phase and generates the failure state flag.

4. The display apparatus of claim 1, wherein:

the driving voltage includes a driving high voltage and a driving low voltage, and the driving switch circuit includes a positive driving switch and a negative driving switch, wherein the positive driving switch and the negative driving switch are configured to operably switch the driving high voltage and the driving low voltage respectively according to the switch control signal to generate the panel load driving signal; and the detection comparison circuit includes a positive detection circuit and a negative detection circuit, wherein the positive detection circuit is configured to operably generate the detection comparison result according to the electrical characteristic of the panel load line and the driving high voltage, and the negative detection circuit is configured to operably generate the detection comparison result according to the electrical characteristic of the panel load line and the driving low voltage.

5. The display apparatus of claim 1, further comprising another driving stage circuit requiring protection, wherein the display panel circuit further includes another panel load line requiring protection, wherein the driving stage circuit requiring protection and the panel load line requiring protection need to avoid receiving the test driving signal; the driving stage circuit requiring protection being configured to operably generate another panel load driving signal requiring protection according to the display control signal, and the panel load driving signal requiring protection being coupled to the panel load line requiring protection to drive the display panel circuit to perform the scanning display operation;

wherein the driving logic circuit further generates a test phase mask signal according to the phase determining signal, and the driving stage circuit requiring protection masks the display control signal during the test phase according to the test phase mask signal generated by the driving logic circuit, such that the driving stage circuit requiring protection stop generating the panel load driving signal requiring protection, whereby the display panel circuit stops the display driving operation.

6. The display apparatus of claim 1, wherein:

the driving logic circuit generates the test driving signal to drive the panel load line for testing the failure item of the display panel circuit during at least a first partial time period within the test phase; and the detection and determination circuit detects the electrical characteristic to determine whether the failure item exists and generates the failure state flag during at least a second partial time period within the test phase.

7. The display apparatus of claim 6, wherein the first partial time period and the second partial time period have one of the following relationships: (A) the first partial time period and the second partial time period start and end at the same time; and (B) the second partial time period includes the first partial time period and the second partial time period ends later than the first partial time period.

8. The display apparatus of claim 1, wherein the test phase includes at least one of the followings:

(1) a partial time period of an initialization phase, wherein the initialization phase is a period of time which starts from when a power source of the display apparatus rises above a pre-determined operational voltage threshold and ends at a starting time of a first time execution of the scanning display phase;

(2) a partial time period of a display frame blanking period, wherein the display frame blanking period is a period when the display apparatus does not perform the scanning display operation between display frames which are displayed by the display apparatus through the scanning display operation; and (3) a partial time period of a scanning line blanking period, wherein the scanning line blanking period is a period when the display apparatus does not perform the scanning display operation between scanning lines which are displayed by the display apparatus through the scanning display operation.

9. The display apparatus of claim 8, wherein:

the display control signal includes a display frame synchronization signal and/or a scanning line synchronization signal; and the phase determining circuit determines the test phase and generates the test phase determining signal according to the display frame synchronization signal and/or the scanning line synchronization signal.

10. The display apparatus of claim 1, wherein the phase determining circuit determines the test phase and/or generates the test instruction according to a test mode signal.

11. A panel driving circuit configured to operably drive a display apparatus by generating a panel load driving signal according to a display control signal generated by a timing control circuit and a driving voltage and/or a driving current generated by a driving power circuit, wherein the display apparatus includes a display panel circuit configured to operably execute a scanning display operation, the display panel circuit including a panel load line, and the panel load driving signal being coupled to the panel load line of the display panel circuit of the display apparatus, the panel driving circuit including:

a phase determining circuit, which determines at least a test phase according to the display control signal, or determines at least a test phase and a scanning display phase according to the display control signal, and generates a phase determining signal indicating whether or not in the test phase, wherein the test phase is a part of a period wherein the display panel circuit is not executing the scanning display operation;

a driving stage circuit, which includes a driving switch circuit;

a driving logic circuit, which is configured to operably perform the following driving operations according to the display control signal and the phase determining signal:

(A) when the scanning display phase exists, generating a switch control signal according to the display control signal during the scanning display phase, to control the driving switch circuit of the driving stage circuit to switch the driving voltage and/or the driving current for generating the display driving signal to drive the panel load line such that the display panel circuit performs the scanning display operation; and (B) during a partial time period within the test phase, generating the switch control signal according to a test instruction to control the driving switch circuit of the driving stage circuit to switch the driving voltage and/or the driving current for generating the test driving signal to drive the panel load line for testing a failure item of the display panel circuit, wherein the test instruction is a pre-determined test instruction or a programmable test instruction; and a detection and determination circuit, configured to operably detect an electrical characteristic of the panel load line during the partial time period within the test phase according to the test instruction, for determining whether the failure item exists and generating a failure state flag in correspondence with the determination of the existence of the failure item; the detection and determination circuit including:

a detection comparison circuit, configured to operably detect the electrical characteristic to generate a detection comparison result; and a detection logic circuit, configured to operably determine whether the failure item exists according to the detection comparison result and generate the failure state flag;

wherein the driving stage circuit stops generating the display driving signal when the failure state flag indicates the existence of the failure item, such that the display panel circuit stops the scanning display operation.

12. The panel driving circuit of claim 11, wherein the electrical characteristic includes one or more of a load line voltage, a load line voltage change rate, a load line current, and/or a load line current change rate of the panel load line; and the failure item includes one or more of a short circuit, a leakage current, and/or an over current of the display panel circuit.

13. The panel driving circuit of claim 11, wherein the detection and determination circuit further detects the electrical characteristic of the panel load line for determining the existence of the failure item of the display panel circuit during a partial time period within the scanning display phase and generates the failure state flag.

14. The panel driving circuit of claim 11, wherein:

the driving voltage includes a driving high voltage and a driving low voltage, and the driving switch circuit includes a positive driving switch and a negative driving switch, wherein the positive driving switch and the negative driving switch are configured to operably switch the driving high voltage and the driving low voltage respectively according to the switch control signal to generate the panel load driving signal; and the detection comparison circuit includes a positive detection circuit and a negative detection circuit, wherein the positive detection circuit is configured to operably generate the detection comparison result according to the electrical characteristic of the panel load line and the driving high voltage, and the negative detection circuit is configured to operably generate the detection comparison result according to the electrical characteristic of the panel load line and the driving low voltage.

15. The panel driving circuit of claim 11, wherein the display apparatus further comprises another driving stage circuit requiring protection, and wherein the display panel circuit further includes another panel load line requiring protection, wherein the driving stage circuit requiring protection and the panel load line requiring protection need to avoid receiving the test driving signal; the driving stage circuit requiring protection being configured to operably generate another panel load driving signal requiring protection according to the display control signal, and the panel load driving signal requiring protection being coupled to the panel load line requiring protection to drive the display panel circuit to perform the scanning display operation;

wherein the driving logic circuit further generates a test phase mask signal according to the phase determining signal, and the driving stage circuit requiring protection masks the display control signal during the test phase according to the test phase mask signal generated by the driving logic circuit, such that the driving stage circuit requiring protection stop generating the panel load driving signal requiring protection, whereby the display panel circuit stops the display driving operation.

16. The panel driving circuit of claim 11, wherein:

the driving logic circuit generates the test driving signal to drive the panel load line for testing the failure item of the display panel circuit during at least a first partial time period within the test phase; and the detection and determination circuit detects the electrical characteristic to determine the existence of the failure item and generates the failure state flag during at least a second partial time period within the test phase.

17. The panel driving circuit of claim 16, wherein the first partial time period and the second partial time period have one of the following relationships: (A) the first partial time period and the second partial time period start and end at the same time; and (B) the second partial time period includes the first partial time period and the second partial time period ends later than the first partial time period.

18. The panel driving circuit of claim 11, wherein the test phase includes at least one of the followings:

(1) a partial time period of an initialization phase, wherein the initialization phase is a period of time which starts from when a power source of the display apparatus rises above a pre-determined operational voltage threshold and ends at a starting time of a first time execution of the scanning display phase;

(2) a partial time period of a display frame blanking period, wherein the display frame blanking period is a period when the display apparatus does not perform the scanning display operation between display frames which are displayed by the display apparatus through the scanning display operation; and (3) a partial time period of a scanning line blanking period, wherein the scanning line blanking period is a period when the display apparatus does not perform the scanning display operation between scanning lines which are displayed by the display apparatus through the scanning display operation.

19. The panel driving circuit of claim 18, wherein:

the display control signal includes a display frame synchronization signal and/or a scanning line synchronization signal; and the phase determining circuit determines the test phase and generates the test phase determining signal according to the display frame synchronization signal and/or the scanning line synchronization signal.

20. The panel driving circuit of claim 11, wherein the phase determining circuit determines the test phase and/or generates the test instruction according to a test mode signal.

21. A driving method for driving a display apparatus, wherein the display apparatus includes a display panel circuit configured to operably execute a scanning display operation, the display panel circuit including a panel load line, and the panel load driving signal being coupled to the panel load line of the display panel circuit of the display apparatus, the driving method including:

generating a panel load driving signal according to a display control signal generated by a timing control circuit and a driving voltage and/or a driving current generated by a driving power circuit;

coupling the panel load driving signal to the panel load line to drive the display panel circuit, wherein the panel load driving signal includes a test driving signal and a display driving signal;

wherein the step of generating panel load driving signal includes:

determining at least a test phase according to the display control signal, or determining at least a test phase and a scanning display phase according to the display control signal; and performing the following driving operations according to the display control signal: (A) when the scanning display phase exists, during the scanning display phase, switching the driving voltage and/or the driving current for generating the display driving signal to drive the panel load line such that the display panel circuit performs the scanning display operation; and (B) during a partial time period within the test phase, switching the driving voltage and/or the driving current for generating the test driving signal to drive the panel load line for testing a failure item of the display panel circuit, wherein the test instruction is a pre-determined test instruction, or a programmable test instruction;

detecting an electrical characteristic of the panel load line during a partial time period within the test phase according to the test instruction to generate a detection comparison result;

determining whether the failure item exists according to the detection comparison result;

generating a failure state flag corresponding to the determination of the existence of the failure item; and when the failure state flag indicates the existence of the failure item, stopping generating the display driving signal such that the display panel circuit stops the scanning display operation.

22. The driving method of claim 21, wherein:

the electrical characteristic includes one or more of a load line voltage, a load line voltage change rate, a load line current, and/or a load line current change rate of the panel load line; and the failure item includes a short circuit, a leakage current, and/or an over current of the display panel circuit.

23. The driving method of claim 21, further including:

detecting an electrical characteristic of the panel load line during a partial time period within the scanning display phase according to the test instruction to generate a detection comparison result;

determining whether the failure item exists according to the detection comparison result; and generating a failure state flag corresponding to the determination of the existence of the failure item.

24. The driving method of claim 21, wherein the display apparatus further comprises another driving stage circuit requiring protection, wherein the display panel circuit further includes another panel load line requiring protection, wherein the driving stage circuit requiring protection and the panel load line requiring protection need to avoid receiving the test driving signal; the driving stage circuit requiring protection being configured to operably generate another panel load driving signal requiring protection according to the display control signal, and the panel load driving signal requiring protection being coupled to the panel load line requiring protection to drive the display panel circuit to perform the scanning display operation; the driving method further comprising:

masking the display control signal during the test phase to stop generating the panel load driving signal requiring protection, such that the display panel circuit stops the display driving operation.

25. The driving method of claim 21, wherein the step of testing the display panel circuit further includes:

generating the test driving signal to drive the panel load line during at least a first partial time period within the test phase; and detecting the electrical characteristic to determine whether the failure item exists and generating the failure state flag during at least a second partial time period within the test phase.

26. The driving method of claim 25, wherein the first partial time period and the second partial time period have one of the following relationships: (A) the first partial time period and the second partial time period start and end at the same time; and (B) the second partial time period includes the first partial time period and the second partial time period ends later than the first partial time period.

27. The driving method of claim 21, wherein the test phase includes at least one of the followings:

(1) a partial time period of an initialization phase, wherein the initialization phase is a period of time which starts from when a power source of the display apparatus rises above a pre-determined operational voltage threshold and ends at a starting time of a first time execution of the scanning display phase;

(2) a partial time period of a display frame blanking period, wherein the display frame blanking period is a period when the display apparatus does not perform the scanning display operation between display frames which are displayed by the display apparatus through the scanning display operation; and (3) a partial time period of a scanning line blanking period, wherein the scanning line blanking period is a period when the display apparatus does not perform the scanning display operation between scanning lines which are displayed by the display apparatus through the scanning display operation.

28. The driving method of claim 27, wherein:

the display control signal includes a display frame synchronization signal and/or a scanning line synchronization signal; and the step of determining the test phase includes: determining the test phase according to the display frame synchronization signal and/or the scanning line synchronization signal.

29. The driving method of claim 21, further comprising: determining the test phase and/or generating the test instruction according to a test mode signal.

* * * * *